(12) United States Patent
Adkins

(10) Patent No.: US 6,697,573 B1
(45) Date of Patent: Feb. 24, 2004

(54) HYBRID STEREOSCOPIC MOTION PICTURE CAMERA WITH FILM AND DIGITAL SENSOR

(75) Inventor: Sean Adkins, Vancouver (CA)

(73) Assignee: Imax Corporation, Mississauga (CA)

( * ) Notice: Subject to any disclaimer, the term of this patent is extended or adjusted under 35 U.S.C. 154(b) by 0 days.

(21) Appl. No.: 09/808,229

(22) Filed: Mar. 14, 2001

Related U.S. Application Data

(60) Provisional application No. 60/189,497, filed on Mar. 15, 2000.

(51) Int. Cl.[7] .............................................. G03B 35/00
(52) U.S. Cl. ............................ 396/324; 352/57; 348/46
(58) Field of Search ............................ 348/42, 46, 47, 348/49; 396/324–6, 462; 352/57–65

(56) References Cited

U.S. PATENT DOCUMENTS

| | | | |
|---|---|---|---|
| 5,002,387 A | | 3/1991 | Baljet et al. .................. 352/63 |
| 5,142,357 A | * | 8/1992 | Lipton et al. ................. 348/48 |
| 5,510,831 A | * | 4/1996 | Mayhew ....................... 348/47 |
| 5,982,941 A | * | 11/1999 | Loveridge et al. ........... 382/154 |
| 6,094,215 A | * | 7/2000 | Sundahl et al. .............. 348/155 |
| 6,118,843 A | * | 9/2000 | Jang et al. ..................... 348/51 |
| 6,252,659 B1 | * | 6/2001 | Norita et al. ................ 356/613 |
| 6,271,876 B1 | * | 8/2001 | McIntyre et al. .............. 348/46 |

FOREIGN PATENT DOCUMENTS

EP  0 751 683 A  1/1997  ............ H04N/5/74

OTHER PUBLICATIONS

Lipton, Lenny, *Foundations of the Stereoscopic Cinema: A Study in Depth*. Van Nostrand Rhinehold: New York, 1982, Chapter 6.

* cited by examiner

*Primary Examiner*—Russell Adams
*Assistant Examiner*—Michelle Nguyen
(74) *Attorney, Agent, or Firm*—Dean W. Russell; Kilpatrick Stockton LLP

(57) ABSTRACT

Systems and techniques relating to creating motion pictures are described. Included as part of the system are cameras incorporating two taking lenses, one of which images onto film through a shutter and the other of which images onto a digital sensor.

8 Claims, 4 Drawing Sheets

HYBRID STEREOSCOPIC MOTION PICTURE CAMERA WITH FILM AND DIGITAL SENSOR

REFERENCE TO PROVISIONAL APPLICATION

This application is based on and hereby refers to U.S. Provisional Patent Application Serial No. 60/189,497, filed Mar. 15, 2000, having the same title as appears above.

FIELD OF THE INVENTION

The present invention relates to the photographing of motion picture films where it is desired to obtain both two dimensional images of a scene and also information about the relative distances of objects in the scene from the camera position. More particularly the invention relates to a motion picture camera incorporating two taking lenses, one of which images onto film through a shutter and film advance mechanism to capture a sequence of successive photographic images, and the other of which images onto a digital sensor containing a plurality of photodetectors arranged in a matrix. A means is provided to synchronize the taking of the photographic and digital images. The digital sensor is interfaced to a storage device and this storage device captures the output of the sensor photosites as a function of time. Subsequently, the film is processed and then scanned using a film scanner. The digital form of the film image is then compared to the sensor data using a software program, and using the relative positions of corresponding points between the digitized photographic image and the sensor data, the distance of objects from the camera to each point in the scene may be determined.

BACKGROUND OF THE INVENTION

The use of digital sensors for the capture of image sequences is well known. However, even with current advances in technology a digital sensor system lacks the spatial and color resolution to compete with photographic film in terms of image quality. When a previously photographed motion picture film sequence is combined with computer generated images, a three dimensional model must be constructed for the original scene so that the computer generated image is of the correct size and perspective in order to match the action in the original scene. This may be accomplished by very careful measurement of the original scene when it is photographed, but this process is prone to error and omissions. Various types of range measuring or scanning devices have been proposed, but these are all limited in measurement accuracy and require careful setup and calibration.

A convenient method for obtaining this information is to use stereoscopic image pairs. Assuming that the relative alignments of the two image pairs are known, it is possible to determine the distance to various points in the scene by determining the disparity or coordinate difference between corresponding points in each image of the pair.

Using strictly film photography it is necessary to take two pictures at every time instant that is required for the motion picture film sequence, and this results in twice as much film being exposed as would be required when distance information is not required. The size and weight of this film is inconvenient and costly. However, for use in motion picture films the image quality of a photograph is essential. It would be an improvement to combine the image quality of the photographic process with a digital sensor that would allow determination of distance without the use of range scanners or other measuring devices.

SUMMARY OF THE INVENTION

It is an object of the present invention to provide a photographic quality image sequence accompanied by sufficient digital data that a three dimensional model of the scene may be constructed. It is another objective of this invention to permit the capture of stereoscopic image pairs without requiring the use of two film cameras or any other system that makes two photographic images at every time instant in order to create a sequence of stereoscopic image pairs.

It is another object of the present invention to capture the second image of the stereoscopic image pair sequence using a digital image sensor and storage device. Said device may capture consecutive frames of image data using a plurality of sensors arranged in a matrix, and such image data frames may be stored within the camera in a semiconductor or disk memory.

DETAILED DESCRIPTION WITH REFERENCE TO THE DRAWINGS

Figure 1:
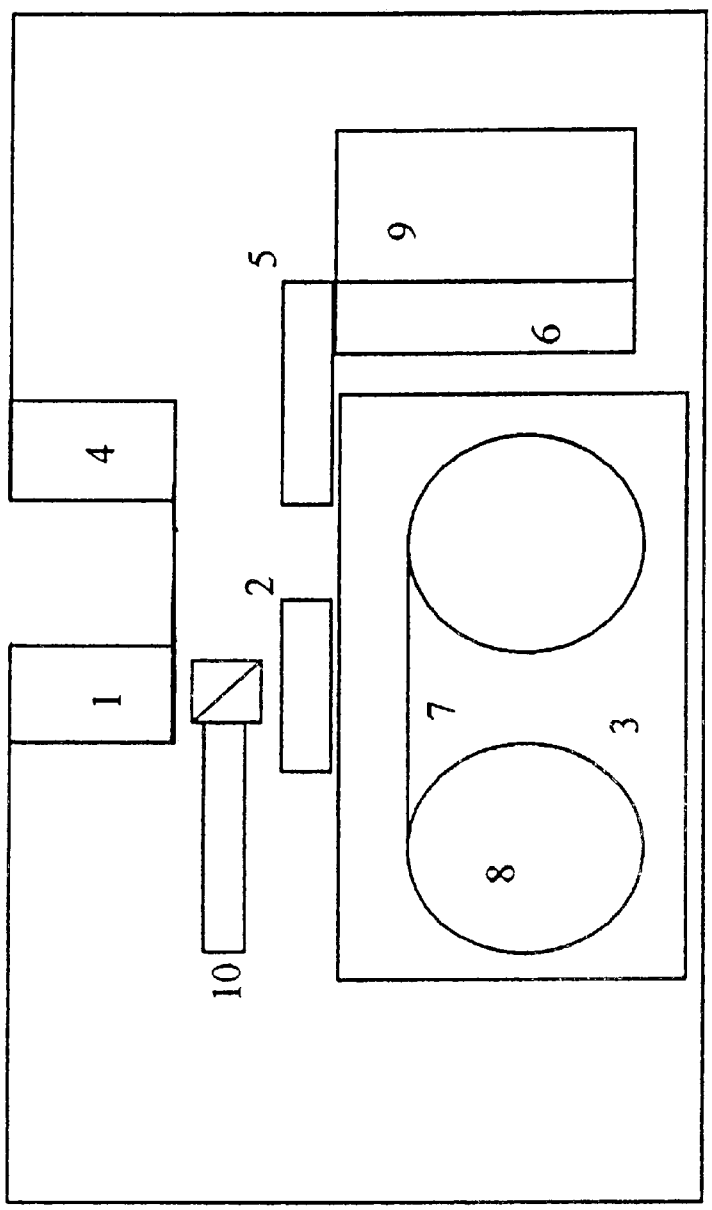
FIG. 1 depicts the components of the present invention.

Referring to FIG. 1 there is shown camera system consisting of a removable film 7 loaded into film reels 8 and moved by film transport 3, which moves the film 7 past the rotating shutter 2 and taking lens 1. There is a second taking lens 4, which images light onto digital sensor 5. Digital sensor 5 is controlled by electronics package 6 which stores the image data from sensor 5 onto digital storage medium 9 which may be removed from the camera system.

Electronics package 6 supplies control signals to the film transport 3 and shutter 2 so as to coordinate the taking of successive images onto film 7 with the electronic storage of images from the digital sensor 5. It is also possible for the camera to incorporate a viewing system 10 that allows the operator to see the image taken by the film camera lens.

All of the components except 1 and 4 are enclosed in a light tight housing 11.

Figure 2:
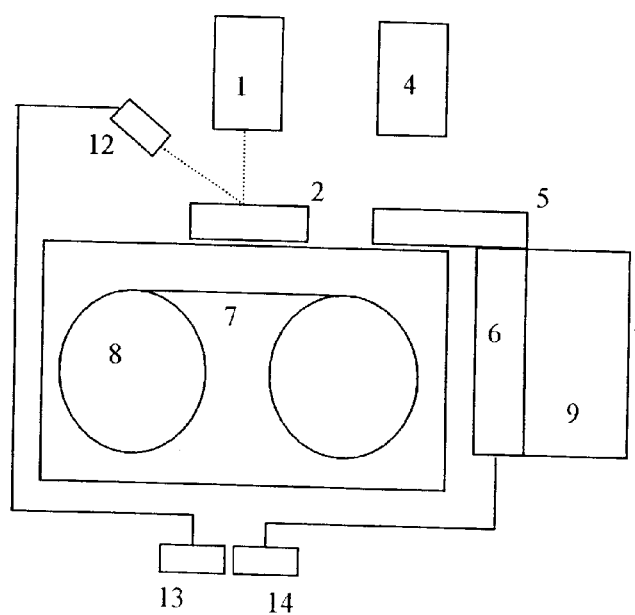
FIG. 2 depicts a viewfinder for the present invention.

In FIG. 2 we show a method of providing a viewing system for use with the camera. This consists of a mirror on the film image taking lens shutter which reflects the light from the lens when the shutter is closed onto a second digital sensor 12, and an output from the electronics package 6 that constructs a similar view from the image data captured by digital sensor 5. The signals representing the data from sensors 5 and 12 are sent to a pair of LCD displays 13 and 14 arranged as a viewing system so that the operator can view the image seen through taking lens 1 with one eye, and taking lens 4 with the other eye, thus seeing in perspective the scene to be photographed.

Figure 3:
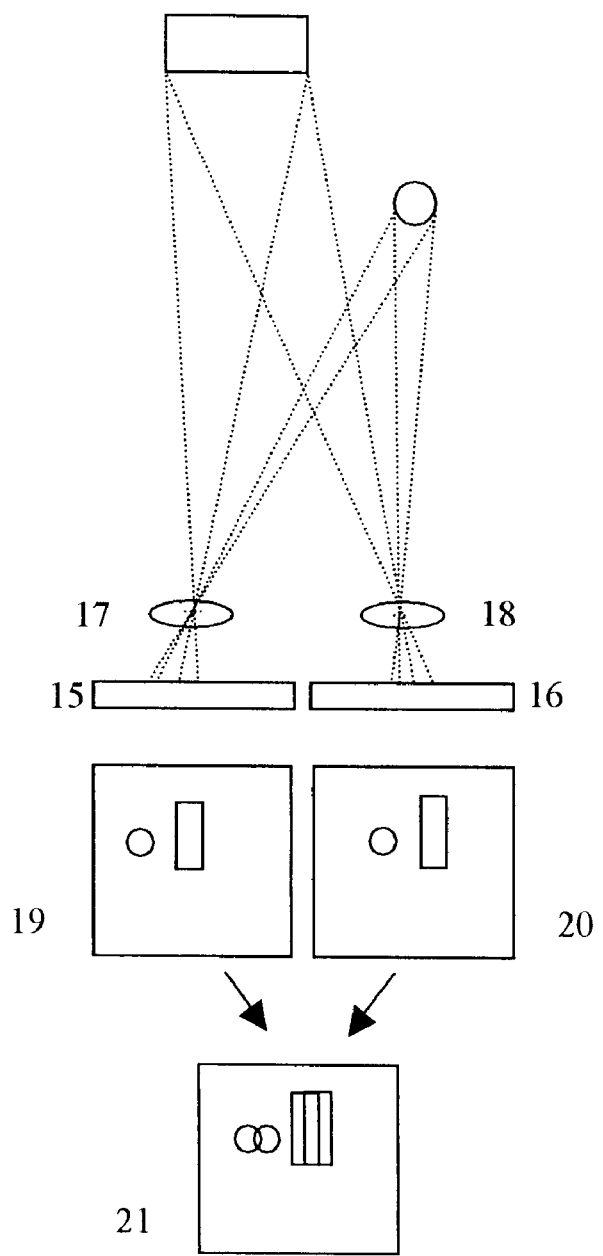
FIG. 3 describes how depth information may be obtained from a film image and a digital image that form a stereo pair.

In FIG. 3 we show a schematic representation of the film image 15 for a particular scene at a particular moment in time and a data image 16 from the digital sensor for the same scene and moment in time. If the optical axis of the lenses 17 and 18 are parallel, then points registered on each of the image planes 19 and 20 from a point on the objects in the scene will be displaced by an amount that is a function of the distance from the camera to the object. This is shown at 21 in FIG. 3 where the images 19 and 20 are shown superimposed. By converting the film image to a digital representation a computer program may be used to determine the correspondence between the points in the film image and the digital image and then compute the depth information associated with each point. This is done using a series of steps such as those shown in FIG. 4.

Figure 4:
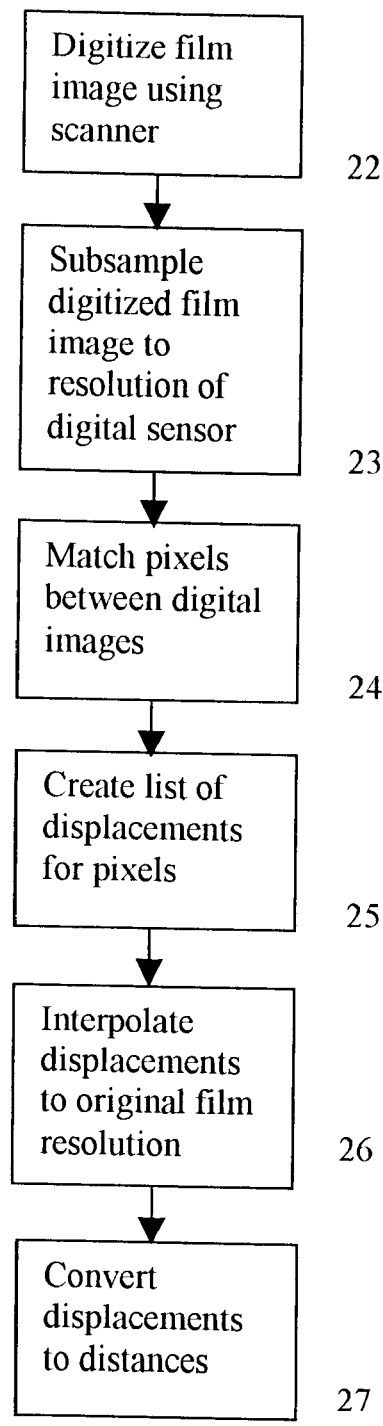
FIG. 4 describes a software method for computing depth information from the image pair.

In FIG. 4 at 22 each frame of the film image is converted to digital data using a film scanner. The film image is then sub-sampled at 23 to down to the resolution of the digital sensor which is typically lower than the resolution of the film scanner. At 24 a matching process is performed by for example comparing the color and intensity of each pixel between the subsampled digitized film image and the digital sensor. It may be necessary to first perform a color calibration step to match the color responses of the film and digital sensors. At 25 a list of pixel displacements is created that describes the displacement between the two images. The displacements are in terms of the subsampled pixels, and it is desirable to convert these displacements to the resolution of the original digitized film image. This is done at 26 where each displacement distance is interpolated to the higher resolution. A depth map is then created at 27 by converting the displacements to distance based on the separation of the film and digital image taking lenses and the focal length of these lenses.

What is claimed is:

1. A method of making a motion picture, comprising:
   a. recording, using a recording device, a series of consecutive stereoscopic image pairs for a moving scene without exposing two film frames at each instant that is to be captured, comprising:
      i. capturing one of each pair of images in the series using film; and
      ii. capturing the other of each pair of images in the series using a digital sensor and a storage device;
   b. processing and digitizing the film to produce digitized photographic images; and
   c. constructing a model of the moving scene using the digitized photographic images and the images captured using the digital sensor and the storage device, the constructing comprising:
      i. determining correspondence between points appearing in the digitized photographic images and the images captured using the digital sensor and the storage device; and
      ii. using relative positions of corresponding points to determine distances from the recording device of objects appearing in the images.

2. A method according to claim 1 in which determining correspondence between points comprises:
   a. sub-sampling the digitized photographic images to the lower resolution of the images captured using the digital sensor and the storage device; and
   b. comparing at least one characteristic of each pixel of the subsampled sub-sampled digitized photographic images and the images captured using the digital sensor and the storage device.

3. A method according to claim 2 in which determining correspondence between points further comprises identifying displacements of the pixels of the sub-sampled digitized photographic images and the images captured using the digital sensor and the storage device.

4. A method according to claim 3 in which determining correspondence between points further comprises converting the displacements to the resolution of the digitized photographic images.

5. A method according to claim 4 in which (i) the recording device comprises taking lenses and (ii) using relative positions of corresponding points to determine distances comprise converting the resolution-converted displacements to distance values based on the separation and respective focal lengths of the taking lenses used to capture the images on film and using the digital sensor and the storage device.

6. A method according to claim 1 in which constructing a model of the moving scene comprises constructing a model perceived by viewers as three dimensional.

7. A method according to claim 1 in which capture of each image of a pair of images is synchronized.

8. A method of making a motion picture, comprising:
   a. recording a series of consecutive stereoscopic image pairs for a moving scene without exposing two film frames at each instant that is to be captured, comprising:
      i. capturing one of each pair of images the series using film; and
      ii. capturing the other of each pair of images in the series using a digital sensor and a storage device;
   b. processing and digitizing the film to produce digitized photographic images; and
   c. constructing a model of the moving scene using the digitized photographic images and the images captured using the digital sensor and the storage device.

* * * * *